(12) United States Patent
Phan et al.

(10) Patent No.: US 9,858,569 B2
(45) Date of Patent: Jan. 2, 2018

(54) SYSTEMS AND METHODS IN SUPPORT OF AUTHENTICATION OF AN ITEM

(71) Applicants: Charles Phan, Unterägeri (CH); Rune Wetlesen, Baar (CH); David Beddington, Zug (CH); Ari Andricopoulos, Hagendorn (CH); Antti Aitio, Huenenberg See (CH); Ramanan Navaratnam, Zug (CH)

(72) Inventors: Charles Phan, Unterägeri (CH); Rune Wetlesen, Baar (CH); David Beddington, Zug (CH); Ari Andricopoulos, Hagendorn (CH); Antti Aitio, Huenenberg See (CH); Ramanan Navaratnam, Zug (CH)

(73) Assignee: Ramanan Navaratnam, Zug (CH)

( * ) Notice: Subject to any disclaimer, the term of this patent is extended or adjusted under 35 U.S.C. 154(b) by 769 days.

(21) Appl. No.: 14/222,278

(22) Filed: Mar. 21, 2014

(65) Prior Publication Data

US 2015/0269570 A1    Sep. 24, 2015

(51) Int. Cl.
*G06Q 20/00* (2012.01)
*G06Q 20/38* (2012.01)
*G06Q 20/40* (2012.01)
*G06Q 20/32* (2012.01)
*G06Q 30/00* (2012.01)

(52) U.S. Cl.
CPC ..... *G06Q 20/3829* (2013.01); *G06Q 20/3276* (2013.01); *G06Q 20/382* (2013.01); *G06Q 20/4016* (2013.01); *G06Q 30/0185* (2013.01)

(58) Field of Classification Search
CPC .................................................. G06Q 30/018
USPC .......................................................... 705/62
See application file for complete search history.

(56) References Cited

U.S. PATENT DOCUMENTS

| | | | | |
|---|---|---|---|---|
| 6,226,619 | B1* | 5/2001 | Halperin | B65D 23/14 705/23 |
| 8,447,987 | B1* | 5/2013 | Polonsky | H04L 9/3247 235/440 |
| 2005/0049979 | A1* | 3/2005 | Collins | G06K 17/00 705/75 |
| 2007/0017987 | A1* | 1/2007 | Lapstun | G06F 3/03545 235/440 |

* cited by examiner

*Primary Examiner* — Charles C Agwumezie
(74) *Attorney, Agent, or Firm* — Leason Ellis LLP

(57) ABSTRACT

Systems and methods for providing authentication of items such as goods, as they are passed through commerce and change ownership. As described herein, the systems and methods certify authenticity of product origin and provide proof of current ownership by creating a publicly verifiable live audit trail using digital signatures, asymmetric (public/secret) key cryptography, an item labeling system, and a mobile authentication client application to capture information about transactions related to an item, perform transactions and record transactions in conjunction with the back end servers.

12 Claims, 7 Drawing Sheets

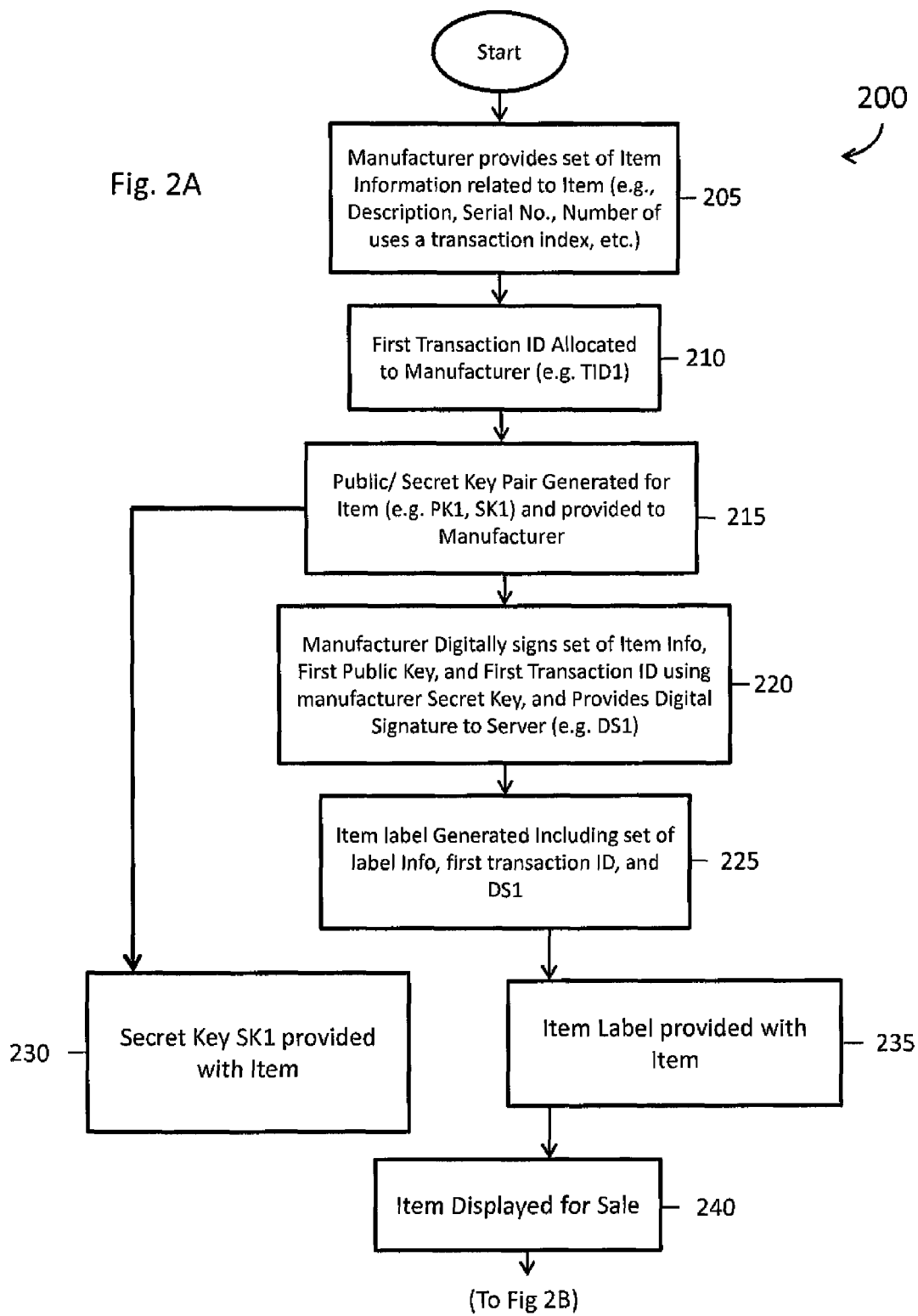

SYSTEMS AND METHODS IN SUPPORT OF AUTHENTICATION OF AN ITEM

FIELD OF THE INVENTION

The present invention relates to an authentication management system and method, and more particularly, to a system and method in support of managing authentication of goods and a mobile electronic device thereof.

BACKGROUND OF THE INVENTION

It is estimated that the total value of counterfeit transactions taking place globally is around 500 billion Euro (approximately $680 billion) per year. This equates to estimated damages of between 5% and 7% of the value of world trade. Current anti-counterfeit systems are based on proprietary solutions that can be manipulated by hackers or rogue employees or tampered with. Improvements are needed, including improvements that can utilize a mobile authentication client to create a live audit trail that cannot be modified, and which can authenticate a physical item to thereby protect against counterfeit products.

SUMMARY OF THE INVENTION

Technologies are presented here in support of systems and methods of providing authentication of items in commerce.

According to a first aspect, a method in support of authentication of an item is disclosed. The method is performed by one or more servers connected to a network and having a memory, a processor, and one or more code sets stored in the memory and executable in the processor. The method includes the steps of receiving, by the processor of the server, first item information for inclusion in a first label to be associated with the item and allocating a first transaction identification (ID) to the manufacturer of the item. In addition, the server processor generates a first secret key having a corresponding first public key. The method also includes, receiving, by the server processor, a manufacturer-digital signature for inclusion with the first item information and the first transaction ID in the first label. The manufacturer-digital signature is generated by the manufacturer of the item using at least the first item information, the first public key, the first transaction ID, and a manufacturer secret key associated with the manufacturer and having a corresponding manufacturer public key. In addition, the first transaction ID, the manufacturer-digital signature, and the first public key are recorded in a first block of a digital block chain. The method also includes generating, by the server processor, the first label having a set of label data comprising at least the first item information, the first transaction ID, and the manufacturer-digital signature and providing the first label and the first secret key to the manufacturer of the item to be associated with the item. In addition, the method includes receiving, at the server processor, a first owner registration request comprising, at least, a first digital signature generated using at least the first secret key and to digitally sign a first message comprising at least the first transaction ID; a second public key, the second public key being associated with a first owner of the item and having a corresponding second secret key. Responsive to the registration request, the method includes verifying, by the server processor, that the first transaction ID has not been recorded in the digital block chain in association with another public key subsequent to being recorded in association with the first public key. In addition, the method includes generating, by the server processor, based on the first owner registration request, a second transaction ID and recording the second transaction ID, the first digital signature, and the second public key in a second block of the digital block chain.

According to another aspect, a method in support of authentication of an item by a first owner of the item is disclosed. Wherein, the item has a first secret key and a first public key associated with the item and wherein the first secret key is associated with a manufacturer of the item and the first public key corresponds to the first secret key. The method begins with the step of scanning the first secret key using a mobile electronic device having a reader and a memory and a processor configured by executing instructions therein. In addition, the label is scanned to retrieve, at least, the first public key and the first transaction ID from the label. The method also includes, transmitting by the mobile device to a server a first transaction registration that includes a first digital signature generated using the first secret key. The first digital signature also includes the first transaction ID, and a second public key which is associated with the first owner of the item and a corresponding second secret key. The method also includes causing the server to verify, based on the first transaction registration, that the first transaction ID has not been previously recorded in association with another public key subsequent to being recorded in association with the first public key. The method also includes causing the server to generate, based on the first transaction registration, a second transaction ID and causing the server to record the second transaction ID, the first digital signature, and the second public key in a second transaction block of the digital transaction chain.

According to another aspect, a system for verifying current ownership of goods or services is provided. The system includes a processor and a computer-readable storage medium which includes instructions in the form of at least one software module and a database stored therein.

The database includes transaction blocks which each includes information useable to identify a) a manufacturer or service provider, b) an item or service associated with the manufacturer or service provider, and c) a current owner of the item or service. Also included in the database is at least one digital block chain. Each digital block chain includes at least one link that defines a temporal relationship between an initial transaction block that identifies the item or service and one or more subsequent transaction blocks that identify the same item or service. The initial transaction block is generated using a manufacturers-digital signature associated with the respective manufacturer or service provider, and the at least one subsequent transaction block is generated using a signature associated with a respective current owner of the particular item or service.

The software modules stored on the storage medium include: a communication module that, when executed by the processor, configures the processor to receive an authentication request identifying the item or service and to receive a message signed using a secret key associated with a purported owner of the item or service. The software modules also include an ownership authentication module that, when executed by the processor, configures the processor to identify a most recent transaction block of the digital block chain associated with the item or service identified in the authentication request and to verify that the signature used to generate the most recent transaction block corresponds to the message signed using the secret key associated with the purported owner of the item or service.

These and other aspects, features and advantages of systems and method will be understood with reference to the following description of certain embodiments of the invention.

BRIEF DESCRIPTION OF THE DRAWINGS

FIGS. 2A and 2B are a detailed flow diagram illustrating elements of a method for managing authentication of an item according to embodiments of the invention;

DETAILED DESCRIPTION OF EMBODIMENTS OF THE INVENTION

Figure 1:
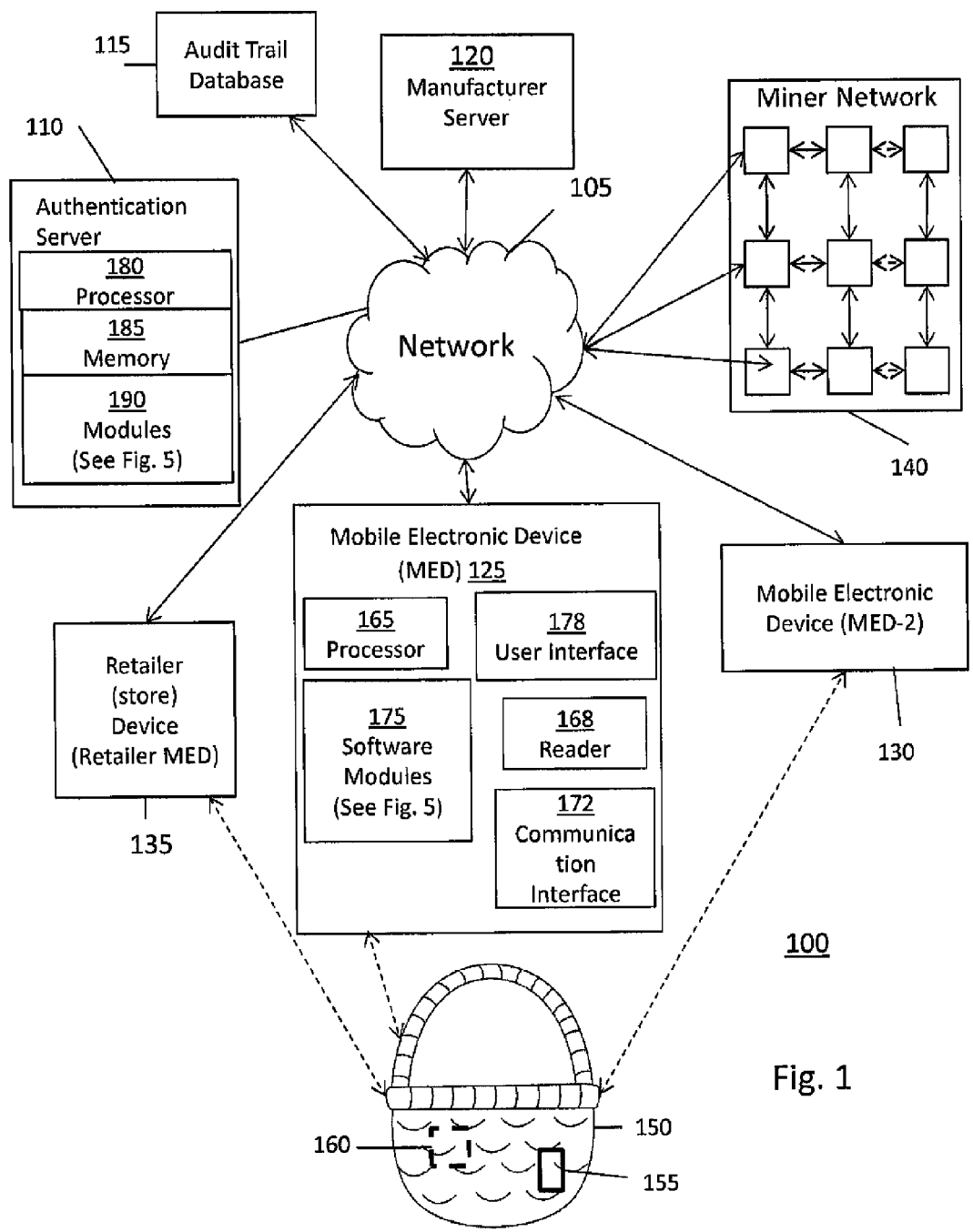
FIG. 1 is a high-level diagram illustrating an exemplary configuration of a system for managing authentication of an item according to embodiments of the invention.

By way of overview and introduction, various systems and methods are described herein that facilitate authentication of items such as goods, as they are passed through commerce and change ownership. As described herein, the systems and methods certify authenticity of product origin and provide proof of current ownership through a live audit trail. In addition, the current owner can add to the audit trail without having the ability to alter the historic record, and can pass ownership to a new owner who can verify the audit trail independently. The live audit trail includes a record of passing ownership, the item originator's identity (e.g., a manufacturer), subsequent owner's identity, a message from the producer or manufacturer, messages from subsequent owners, etc., none of which can be altered or tampered with.

This is accomplished in accordance with several aspects of embodiments of the invention by creating a publicly verifiable live audit trail using digital signatures, asymmetric (public/secret) key cryptography, an item labeling system, and a mobile authentication client (application) to capture information about transactions related to an item. An audit trail as understood herein refers to a security-relevant digital chronological record, set of records, or destination and source of records that provide documentary evidence of the sequence of activities that have affected an item at any time. In different embodiments, the system described herein can either create its own audit trail, or can harness an existing audit trail to record transactions. For example, a transaction identification (ID) can be acquired (e.g., purchased or "mined") and used as a "genesis node" (origination point) in an existing audit trail.

As transactions are recorded, each transaction is locked irrevocably into a chain of transactions (also referred to as the audit trail, or block chain) using cryptographic hash functions (known as "hashing") that create "digests" containing the current transaction and the digest of the historical ones that led to the very last (and most current) transaction. Accordingly, it can be appreciated that a 'block' is one or a group of records of transactions and a 'block chain' is a group of blocks with forward and/or backward links suitable for identifying and addressing individual blocks in the chain such that the blocks can be ordered according to a criteria (e.g., chronological).

The live audit trails provide a comprehensive electronic record of ownership of an item traced back to the manufacturer and can be stored on one or more private or public computing devices or computing networks, such as cloud storage devices. Accordingly, the audit trails can be accessed and reviewed by users using a client application, as further described herein. Moreover, each purchaser using, for example, the client application, can maintain a virtual "wallet" identifying all items that the user currently owns or has purchased, so as to facilitate inventory management or transfer of such items, as further described herein.

Briefly, a hash function takes an input message in digital form, scrambles the message, and condenses it to a shorter digest such that even a minor change in the original message will result in a vastly different digest that is output, compared with the output of the unchanged original message. Hashing functions are easy to compute in one direction and difficult to find the inverse. There are a number of standard hash functions commonly used, such as, for example, MD5, MD4, SHA-256, and SHA-1. Accordingly, histories of previous transactions are further locked irrevocably in the live audit chain by hashing those histories along with the most recent transaction providing a comprehensive chain of transactions from genesis to the most recent transaction that can be used to audit the transactions.

In addition, the complexity of hashing provides what is known as a "proof of work." In a proof of work, a process is expected to solve a mathematical puzzle (such as solving a cryptographic hash) that takes on average a certain amount of computing power, and hence a finite amount of time. A chain of puzzles where the input to one puzzle depends on the output of the previous puzzle ensures an increase in complexity as the chain grows, thus making cheating to provide a certain amount of proof of work increasingly difficult.

Employing a peer-to-peer audit trail, a network of computers can work together to solve the hashes and lock the transaction into the live audit trail. A proof of work feature deters the introducing of fake transactions by any one individual, as providing the requisite amount of proof of work would require out-pacing the entire peer-to-peer network, which would involve spending a large amount of time and require prohibitive computing power. It should be understood that a proof-of work feature is optional and that the enforcement of proof-of-work requirements can depend on the particular configuration of a given implementation of a system in accordance with one or more embodiments of the invention.

Incorporating known methods of asymmetric (public/secret) key cryptography, manufacturers, original owners, and second-hand owners of an item can verify the change of ownership (i.e., transaction IDs) of the item. Briefly, asymmetric key cryptography refers to a cryptographic algorithm which requires two separate keys, one of which is secret (or private) and one of which is public. Although different, the two parts of this key pair are mathematically linked. The public key is used to encrypt a message (referred to as plaintext) or to verify a digital signature; whereas the private key is used to decrypt the encrypted message (referred to as ciphertext) or to create a digital signature. The term "asymmetric" stems from the use of different keys to perform these opposite functions, each the inverse of the other—as contrasted with conventional ("symmetric") cryptography which relies on the same key to perform both.

The strength of asymmetric cryptography lies in the fact that it is "impossible" (computationally infeasible) for a properly generated private key to be determined from its corresponding public key. Thus the public key may be published without compromising security, whereas the private key must not be revealed to anyone not authorized to read messages or perform digital signatures. Message authentication involves processing a message with a private key to produce a digital signature. Thereafter anyone can verify this signature by processing the signature value with the signer's corresponding public key and comparing that result with the message. Success confirms the message is unmodified since it was signed, and—presuming the signer's private key has remained secret to the signer—that the signer, and no one else, intentionally performed the signature operation. In practice, typically only a hash or digest of the message, and not the message itself, is encrypted as the signature.

A digital signature is a mathematical scheme for demonstrating the authenticity of a digital message or document. A number of different digital signature algorithms have been developed and are commonly used in practice, such as the Digital Signature Algorithm (DSA), the Elliptic Curve Digital Signature Algorithm (ECDSA), and the Schnorr signature algorithm, for example. A valid digital signature gives a recipient reason to believe that the message was created by a known sender, such that the recipient can be assured the sender sent the message (authentication and non-repudiation) and that the message was not altered in transit (integrity). Digital signatures are commonly used for software distribution, financial transactions, and in other cases where it is important to detect forgery or tampering. These concepts can be incorporated into the authentication system as described below.

FIG. 1 shows a high-level diagram illustrating an exemplary configuration of a system for providing authentication of an item according to embodiments of the invention. System 100 includes wireless network 105, authentication server 110, audit trail database 115. Other devices cooperate with these components when the system is in use, including a manufacturer server 120, at least one mobile electronic device (MED), such as MED 125, MED 130, and retailer MED 135. Optionally, system 100 can also include a miner network 140 including one or more computing devices that collaboratively perform a defined task such as hashing, as further described herein.

The system also includes one or more items 150 associated with respective labels 155 and first secret keys 160, for example, the associated labels and keys can be affixed to the item or otherwise provided to the purchaser in association with the item. It should be noted that while in the example embodiment of FIG. 1, item 150 is depicted as a designer handbag, item 150 can alternatively be a pharmaceutical bottle, a shipping container, a vehicle, a luxury good, a weapon, etc., or any item to which label 155 and the first secret key 160 can be provided in conjunction with the sale of the item 150. For example, in some implementations the label 155 can be affixed to the item 150 and the secret key 160 hidden inside the item 150. In some implementations the label 155 can be provided to the purchaser along with the item 150 and the secret key 160 can be provided separately, say, as an electronic communication. Furthermore, label 155 and first secret key 160 may include information (data) in the form of text, a bar code, a QR code, an NFC tag, or any other representation of the information as described in detail below.

The authentication server 110 can be practically any computing device and/or data processing apparatus capable of communicating with mobile electronic devices 125, 130, and 135, and other remote computing devices or computing networks (e.g., manufacturer server 120, Miner network 140 and audit trail database 115), receiving, transmitting and storing electronic information and processing requests as further described herein. Authentication server 110, manufacturer server 120, Miner network 140 and audit trail database 115 are intended to represent various forms of digital computers, such as laptops, desktops, workstations, personal digital assistants, servers, blade servers, mainframes, and other appropriate computers and/or networked or cloud based computing systems.

It should be noted that while FIG. 1 depicts the system 100 with respect to MEDs 125, 130, 135, manufacturer server 120, Miner network 140 and audit trail database 115, it should be understood that any number of such devices/networks can interact with the system 100 in the manner described herein. At various points during the operation of the system 100, the MEDs (125, 130, 135) can communicate with one or more computing devices, such as authentication server 110, network 105, and/or remote computing devices/networks (e.g., manufacturer server 120, miner network 140, audit trail database 115, etc.). Such computing devices transmit and/or receive data to/from the MEDs, and between one-another, thereby preferably initiating maintaining, and/or enhancing the operation of the system 100, as will be described in greater detail below.

The mobile device 125 can be any computing device and/or data processing apparatus capable of embodying the systems and/or methods described herein, including but not limited to a personal computer, tablet computer, personal digital assistant, mobile electronic device, cellular telephone or smart phone device and the like. As shown in FIG. 1, the MEDs, for example MED 125, includes various hardware and software components that serve to enable operation of the system 100, including one or more processors 165, a memory 190, a user interface 178, electronic readers 168, and a communication interface 172.

Processor 165 can be a number of processors, a central processing unit CPU, a graphics processing unit GPU, a multi-processor core, or any other type of processor, depending on the particular implementation. Preferably, the memory 170 is accessible by the processor, thereby enabling the processor to receive and execute instructions encoded in the memory so as to cause the MED 125 and its various hardware components to carry out operations for aspects of the exemplary systems and methods disclosed herein. Memory can be, for example, a random access memory (RAM) or any other suitable volatile or non-volatile computer readable storage medium. Memory can also include storage which can take various forms, depending on the particular implementation. For example, the storage can contain one or more components or devices such as a hard drive, a flash memory, a rewritable optical disk, a rewritable magnetic tape, or some combination of the above. In addition, the memory and/or storage can be fixed or removable. In addition, memory and/or storage can be local to the MED 125 or located remotely.

Figure 5:
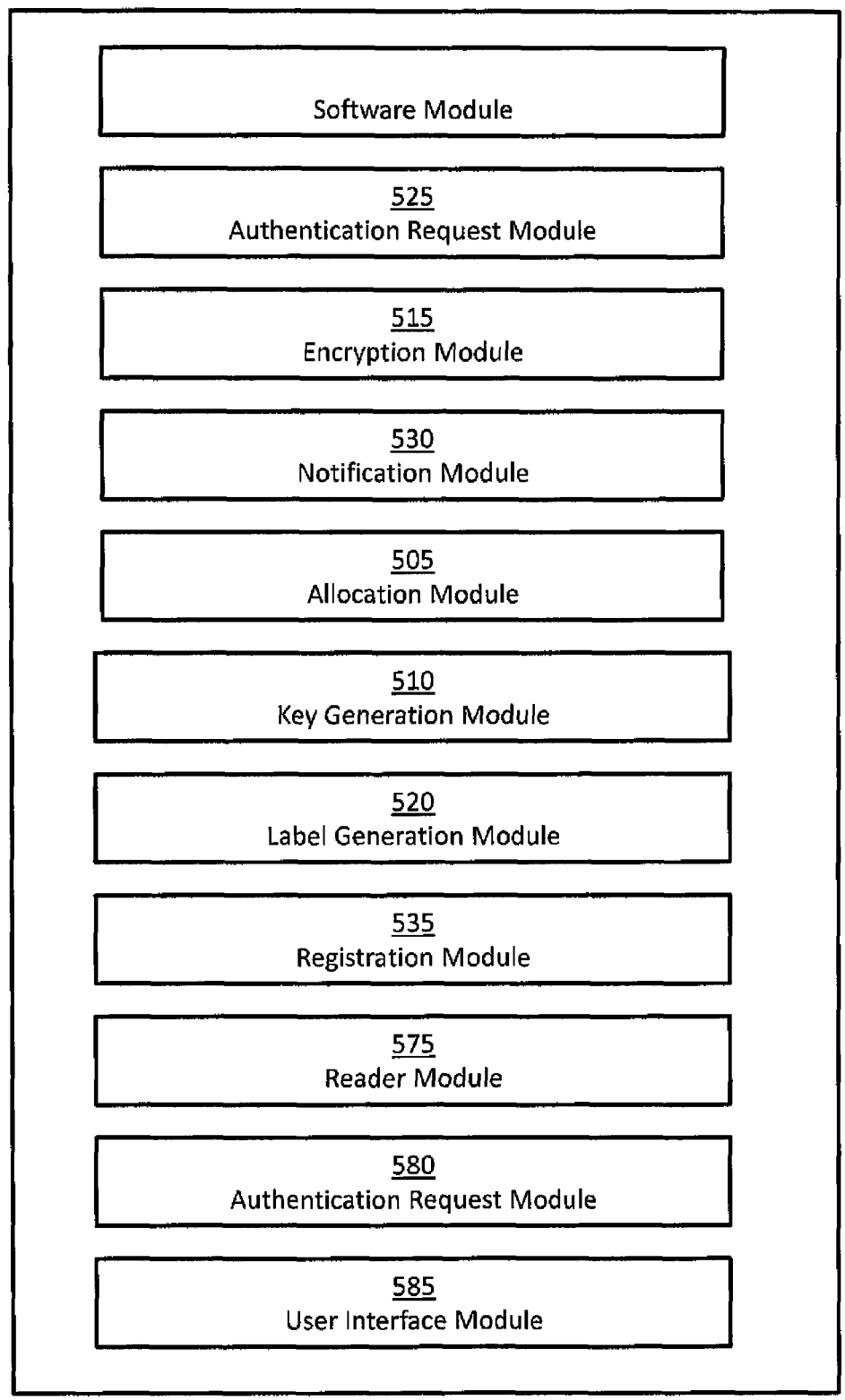
FIG. 5 is a block diagram of a computer program according to embodiments of the invention.

One or more software modules 175 are encoded in the memory 170 of MED. The software modules can comprise one or more software programs or applications having computer program code or a set of instructions (collectively referred to as the "authentication client application") executed in the processor 165. Such computer program code or instructions configure the processor 165 to carry out operations of the systems and methods disclosed herein and can be written in any combination of one or more programming languages. As shown in FIG. 5, the exemplary software modules can include the authentication module 525, the encryption module 515, the notification module 530, the allocation module 505, the key generation module 510, the label generation module 520, the registration module 535, the reader module 575, the authentication request module 580 and the user interface module 585.

The program code can execute entirely on MED 125, as a stand-alone software package, partly on mobile device, partly on authentication server 110, or entirely on authentication server 110 or another remote computer/device. In the latter scenario, the remote computer can be connected to mobile device 125 through any type of network 105, including a local area network (LAN) or a wide area network (WAN), mobile communications network, cellular network, or the connection can be made to an external computer (for example, through the Internet using an Internet Service Provider).

A user interface 178 is also operatively connected to the processor 165. The interface can be one or more input or output device(s) such as switch(es), button(s), key(s), a touch-screen, microphone, display, etc. as would be understood in the art of electronic computing devices. User Interface serves to facilitate the providing of information to a user and the capture of commands from the user such as an on-off commands or user information and settings related to operation of the system 100.

One or more electronic readers 168 can be operatively connected to the processor 165. The electronic reader serves to facilitate the capture of electronic information from the item 150. For example, in the context of a mobile point of sale (MPOS) transaction, the MED can be equipped with a camera for capturing a digital image of a bar-code on item 150. By way of further example, the electronic reader can also be a NFC-enabled reader that can read data from a NFC enabled chip or RFID tag included with the item 150.

Communication interface 172 is also operatively connected to the processor 165 and can be any interface that enables communication between the MED 125 and external devices, machines and/or elements. Preferably, the communication interface can include but is not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, and/or any other such interfaces for connecting the MED to other computing devices and/or communication networks such as private networks and the Internet. Such connections can include a wired connection or a wireless connection (e.g., using the 802.11 standard) though it should be understood that the communication interface can be practically any interface that enables communication to/from the mobile device.

The authentication server 110 can also include a processor 180 which is operatively connected to various hardware and software components that serve to enable operation of the system 100. The processor 180 serves to execute instructions to perform various operations relating to item authentication and transaction processing as will be described in greater detail below. In certain implementations, a memory 185 is accessible by the processor 180, thereby enabling the processor 180 to receive and execute instructions stored on the memory and/or storage in the form of one or more software modules 190. The software modules 190 can comprise one or more software programs or applications (collectively referred to as the "server application") having computer program code or a set of instructions executed in the processor for carrying out operations for aspects of the systems and methods disclosed herein. As shown in FIG. 5, the exemplary software modules can include the authentication module 525, the encryption module 515, the notification module 530, the allocation module 505, the key generation module 510, the label generation module 520, the registration module 535, the reader module 575, the authentication request module 580 and the user interface module 585.

Turning to FIG. 2A, a detailed flow diagram illustrating elements of a method for providing authentication of an item according to embodiments of the invention is provided. Generally, Method 200 describes the steps for generating an audit trail and associating the audit trail with an item being put up for sale, for example, using system 100. Method 200 starts at step 205 when authentication server 110, using a processor 180 which is configured by executing one or more software modules 190, including, preferably, allocation module 505, receives a set of item information related to one or more items. In some implementations, the manufacturer server 120 can generate the set of item information and provides the item information to authentication server 110. Item information can optionally include, for example, one or more of the following: a description of the item, a serial number, a number of recommended uses/transactions, number of boxes of the item, number of items per box, etc. The item information is received by the processor 180, and stored in memory for later inclusion in label 155, which is associated with the item as explained in further detail below.

At step 210, in response to receiving the item information, authentication server 110 using a processor 180 which is configured by executing one or more software modules 190, including, preferably, the allocation module 505 can allocate a first transaction identification (ID) to the manufacturer of the item. In some embodiments, the first transaction ID is a unique alpha-numeric string, that when allocated identifies the manufacturer as being uniquely associated with the first transaction ID and the item. In some embodiments, such as in a self-contained (closed) system, allocation may be accomplished by authentication server 110 generating a new first transaction ID, associating it with the manufacturer, and saving a record of the association to memory, for example, in a secure database.

In other embodiments, such as when a peer-to-peer live audit trail (e.g., digital transaction chain or digital block chain) is used, the first transaction ID can either be acquired (e.g., purchased or exchanged), "mined" using a transaction ID mining program, or allocated from a digital transaction wallet containing previously acquired transaction IDs. In embodiments where the first transaction ID is acquired, mined, or allocated from an existing audit trail, the authentication server 110 can be configured to digitally sign a message including the first transaction ID and manufacturer public key provided by manufacturer server 120. The digitally signed first transaction ID and the manufacturer public key can then be recorded in a first transaction block of a digital block chain along with the manufacturer public key, thus effectively transferring the first transaction ID to the manufacturer. It should be noted that the manufacturer also exclusively controls a corresponding manufacturer secret key. The manufacturer secret key can be used in a later transaction to convey authenticity and/or transfer ownership of an item associated with the transaction ID. The first transaction block is eventually hashed using a cryptographic hashing function, to create a first cryptographic hash value for inclusion with a second transaction block of the digital block chain. As explained above, in some embodiments hashing of transaction blocks can be performed by miners in a mining network such as mining network 140, to lock the record of the first transaction ID into the digital block chain.

At step 215, authentication server 110 using the processor 180 which is configured by executing one or more software modules 190, including, preferably, the key generation module 510, can generate a first secret key (e.g., secret key 160) and a corresponding first public key for the item, and provide the first public/secret key pair to manufacturer server 120. It should be noted that one set of item information may require the generation of multiple public/secret key pairs. For example, if a manufacturer is producing an order of five boxes, with each box containing two of the items, authentication server 110 can be configured to automatically generate ten public/secret key pairs, one pair for each item, and provide the public/secret key pairs to manufacturer server 120. Each secret key can be associated with the item and later provided to the purchaser, for example, affixed in a hidden location in, on, or with the item, or transmitted to the purchaser as will be further explained below. For the purposes of this example embodiment only, it is being presumed that only one item is being manufactured and made available for sale and therefore only one (first) public/secret key pair is generated and provided to the manufacturer.

Furthermore, first secret key 160 can include information (data) in the form of text, a bar code, a QR code, an NFC tag, RFID, or any other machine-readable representation of the information. Accordingly, as further described herein, the secret key can be read by a mobile device using an enabled reader.

In some implementations, Authentication server 110, using the processor 180, which is configured by executing one or more software modules 190, including, preferably, the encryption module 515, can encrypt first secret key 160 thus providing an extra layer of security. Accordingly, when the key is read by a configured mobile electronic device, the mobile device can decrypt the key using a decryption algorithm.

At step 220, a manufacturer-digital signature is received by the authentication server 110. In some implementations, the signature can be generated by manufacturer server 115, by digitally signing a message comprising at least the item information, the first public key, and the first transaction ID using the manufacturer secret key. The authentication server 110, using the processor 180, which is configured by executing one or more software modules 190, including, preferably, the allocation module 505, can cause the first transaction ID, the manufacturer's signature and the first public key to be recorded in the digital transaction chain (and in the digital block chain as a block chain insert), thus effectively assigning the first transaction ID to whomever controls first secret key 160. The manufacturer-digital signature is received by authentication server 110 for inclusion with the first item information and the first transaction ID in the first label 155.

At step 225, authentication server 110, using the processor 180, which is configured by executing one or more software modules 190, including, preferably the label generation module 520 can generate the first label 155 having a set of label data comprising at least the first item information, the first transaction ID, and the manufacturer-digital signature. As discussed above in relation to first secret key 160, first label 155 can include information in the form of text, a bar code, a QR code, an NFC tag, RFID, or any other representation of the information. Furthermore, authentication server 110 can encrypt the first label 155, which can then be decrypted using a decryption algorithm when scanned by a mobile electronic device, thus providing an additional layer of security. It should be noted that generating of the label 155 can include generating the label in physical form and/or electronically, in a formatted or unformatted form, and providing the so generated label to the manufacturer for production in physical form.

Figure 3:
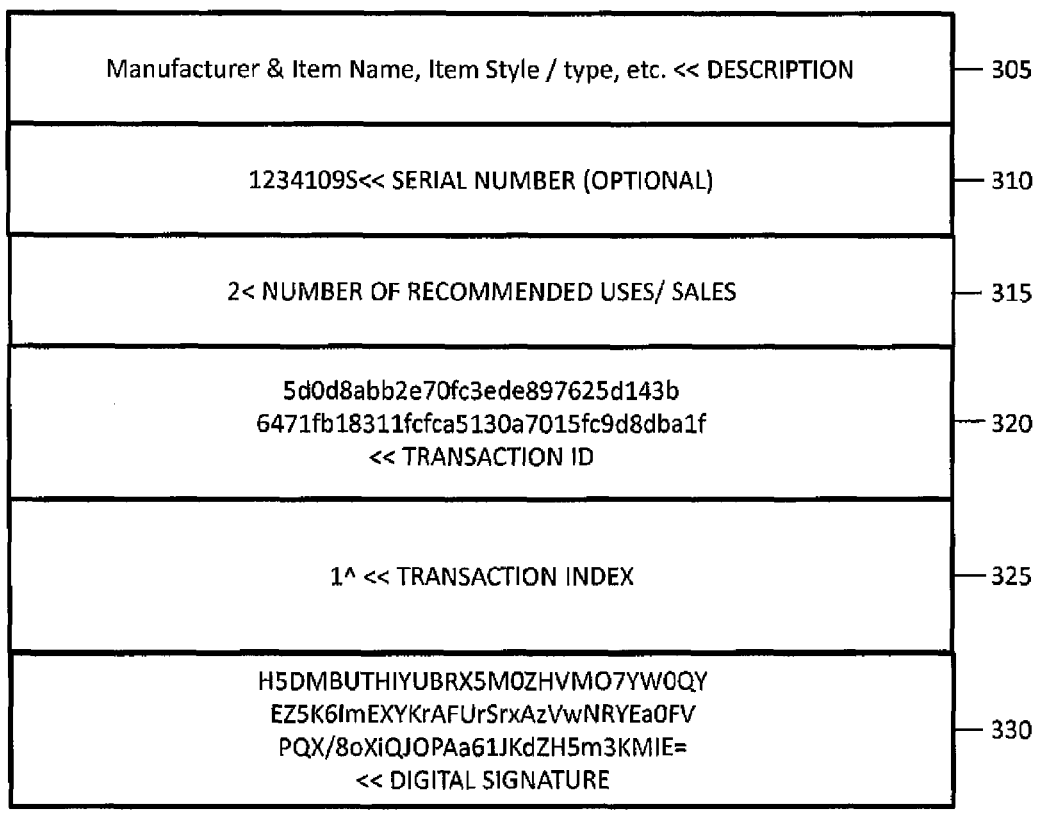
FIG. 3. is an illustration of an example set of label data according to embodiments of the invention.

Turning briefly to FIG. 3, an illustration of an example set of label data is depicted according to embodiments of the invention. The example set of label data includes description 305, serial number 310, number of recommended uses/sales 315, transaction ID 320, transaction index 325, and digital signature 330. Description 305 can include, for example, the name of the manufacturer, the name of the item, the item style/type, item creation and/or expiration date, etc. Transaction index 325 can be included, for example, when multiple copies of the same item are produced. In this case, all other label data may be the same, thus making a hash of the label data the same for each copy. By including a transaction index in the set of label data, and changing (e.g., incrementing) the transaction index for each set of label data, the manufacturer's digital signature of each label is guaranteed to be unique to that label, and thus unique to that item. It should of course be noted that if each label receives a unique serial number 310, rather than the same serial number being used for the set of labels, then transaction index 325 would not be required to generate a unique digital signature for each label. It can be appreciated that the label data is not restricted to the exemplary details mentioned above, and may contain additional or alternative information concerning the product, manufacturer and/or user specific information. For example, if the label is for medicine, the label can include details of dosage, side effects, and the like.

Returning now to FIG. 2A, at step 230, first secret key 160 is provided by the manufacturer. In some implementations, the secret key can be affixed to a first portion of the item so as to remain hidden and/or inaccessible until revealed. In some embodiments, affixing may include stitching, sticking, fastening, inserting, or otherwise placing first secret key 160 in a location within, on, or proximate to item 150 such that first secret key 160 is temporarily hidden from view and/or from being readily scanned. When item 150 includes an inner area, for example, first secret key 160 can be affixed within the inner area such that it cannot be easily accessed. Likewise, first secret key 160 can be affixed (e.g., placed) within packaging, wrapping or any other sealed portion of item 150, such that it can only be accessed by one authorized to open the sealed portion, such as the purchaser/owner of the item, without compromising authentication of the item. It should be noted that in other embodiments, such as when it is not feasible to affix first secret key 160 to item 150 as described above, for practical reasons or due to security concerns, authorization server 110 can be configured to provide first secret key 160 such that it is received by the first purchaser/owner of item 150 via other means. For example, first secret key 160 can be e-mailed, texted, or otherwise digitally or physically delivered to the first purchaser/owner, either directly, by the manufacturer, or via a store where the item is purchased (e.g., automatically printed on a sales receipt), etc. Thus, in some implementations, the first secret key can be provided by the manufacturer in an electronic form to an entity that or person who is authorized to receive the item and be associated in a database with such item.

At step 235, first label 155 is provided by the manufacturer. In some implementations, the label 155 is affixed to a second portion of the item so as to be visible and/or accessible without having to be revealed. In some embodiments, affixing may include stitching, sticking, fastening, embroidering, printing, inserting, or otherwise placing first label 155 in a location within, on, or proximate to item 150 such that first label 155 is visible and/or readily scannable. Unlike first secret key 160, which, as explained in detail below, will be used only once to enable registration of the item to the first owner, first label 155 is intended for use with each owner and potential owner of the item. Therefore, practical considerations can dictate that first label 155 be relatively permanently affixed to item 150 such that first label 155 remains securely with item 150 as item 150 is passed through commercial channels (e.g., from a manufacturer to a retail store, then to a first owner, then to a second owner, etc.), and such that first label 155 can be used in the authentication process at every stage. Although the first label 155 is described as being affixed to the item 150 in some implementations, it should be appreciated that, in addition or alternatively, the first label 155 can be provided to a purchaser separately from the item 150, either in physical form or electronic form.

In some embodiments, first label 155 is affixed to an outside portion of item 150, where it can be easily scanned and the label data can be easily retrieved. For example, a potential purchaser can use the mobile authentication client on a mobile device such as MED 125, a reader 168 such as a camera or wireless transceiver of the MED to scan first label 155 and retrieve the label data without having to first purchase the item in order to be provided the authority to open item wrapping, boxes, etc., to access first label 155. At step 240, once both first secret key 160 and first label 155 have been affixed to item 150, item 150 can be displayed for sale, for example, in a physical store or at an online store accessible over a network such as the Internet.

Figure 2B:
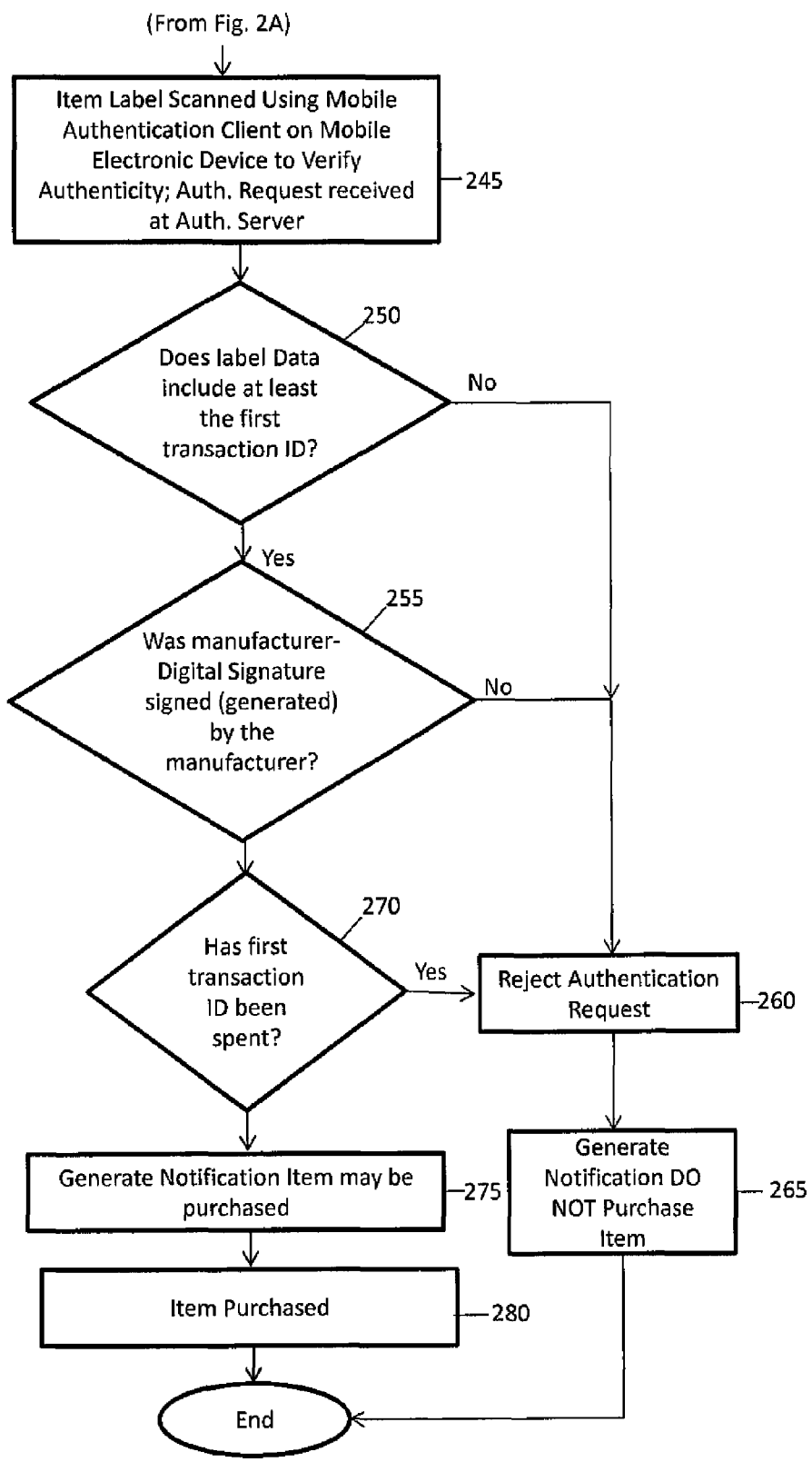

Continuing with method 200 in FIG. 2B, steps 245-280 can be performed to verify the authenticity of the item, say, by a potential purchaser of the item. At step 245, prior to item 150 being purchased, for example, first label 155 of item 150 can be scanned by a potential purchaser using MED 125 to retrieve the label data and query authentication server 110 regarding the authenticity and ownership of item 150. More specifically, MED processor 165, which is configured by executing one or more software modules 175, including, preferably, the reader module 575 and the request module 580, can read the first label using a reader 168 and retrieve the label data. Preferably, the retrieved label data includes, at least, first transaction ID 320 and manufacturer-digital signature 330. In addition, the configured processor 165 can generate a first authentication request including the retrieved label data, and provide the first authentication request to authentication server 110 over network 105, for example.

In some embodiments, if the MED processor 165 cannot decrypt or otherwise retrieve the label data, an error or warning message can be provided by the MED 125 to the potential purchaser indicating the label may be a forgery and that the potential purchaser should not purchase the item.

At step 250, in response to receipt of the first authentication request, authentication server 110, using the processor 180, which is configured by executing one or more software modules 190, including, preferably, the authentication module 525 and the notification module 530, can confirm, based on the first authentication request, that the set of label data included in the authentication request includes at least first transaction ID 320 and manufacturer-digital signature 330; if it does, then authentication continues at step 255.

More specifically, in accordance with embodiments of the invention, authentication server 110, using the configured processor 180, can query database of digital block chains by searching for the first transaction ID 320, which was recorded in the digital block chain at step 220 above. Similarly, the configured processor can verify that the manufacturer-digital signature 330 is included in the digital block chain. If either first transaction ID 320 or manufacturer-digital signature 330 are not located by authentication server 110 in the digital block chain, then, in accordance with some embodiments of the invention, at step 260, authentication server 110 will reject the first authentication request. Accordingly, at step 265, authentication server 110, using the configured processor, can generate an error notification for delivery to an administrator of authentication server 110, manufacturer server 115, the seller of item 150 (e.g., store manager), and/or the sender of the authentication request, indicating, for example, that item 150 cannot be authenticated and/or may be a counterfeit, and method 200 ends.

At step 255, authentication server 110, verifies that the item 150 was manufactured by the purported manufacturer. More specifically the authentication server 110, using the processor 180, which is configured by executing one or more software modules 190, including, preferably the authentication request module 525, can verify that the manufacturer-digital signature 330 was generated by the manufacturer. Presuming the manufacturer-digital signature was in fact generated by the manufacturer using the manufacturer secret key, and presuming the manufacturer has made the corresponding manufacturer public key publicly available (e.g., by publishing it on a company website, including it with the item, or otherwise making it available to potential purchasers), authentication server 110 can use the manufacturer public key to verify that the corresponding manufacturer private key was used to generate the manufacturer-digital signature. If so, then the manufacturer-digital signature is validated, and the authentication process continues at step 270. If not, the authentication request is rejected and a notification can be generated, as described in step 260 and step 265 above.

At step 270, the authentication server 110, using the processor which is configured by executing one or more software modules, including, preferably, the authentication module 525 and the notification module 530, can verify, based on the first authentication request, that the first transaction ID has not been recorded in the digital block chain in association with another public key subsequent to being recorded in association with the first public key, and at step 275, authentication server 110 can be configured to execute notification module 530 to notify a sender of the first authentication request that the item is verified. The act of verifying and the resulting verification confirms that the content of the label is valid and that no purchaser has yet claimed ownership to the item. Accordingly, the potential purchaser is free to purchase the item at step 280.

At this point it should be noted that an authentication request is not necessarily required prior to purchasing item 150, as a similar authentication process is conducted during an owner registration request, as explained in detail below. However, it can be helpful to a potential purchaser's ability to "buy with confidence," particularly when the purchaser is not the intended ultimate owner of the item (e.g., when buying a gift or conducting a purchase on behalf of another) and can help prevent the need to return a purchased item that fails the authentication process during the owner registration request.

Turning again to FIG. 3, as discussed above, first label 155 can include information in the form of text, a bar code, a QR code, an NFC tag, RFID, or any other representation of the information. Therefore, in certain embodiments, such as when a QR code or NFC tag is used, scanning the label with an MED (e.g., MEDs 125, 130, 135) can cause the MED processor 165 to automatically download and/or launch the mobile authentication client on the MED. Likewise, scanning first secret key 160 can cause the MED processor to automatically download and/or launch the mobile authentication client on the MED, if it has not been downloaded and/or launched previously.

Figure 4:
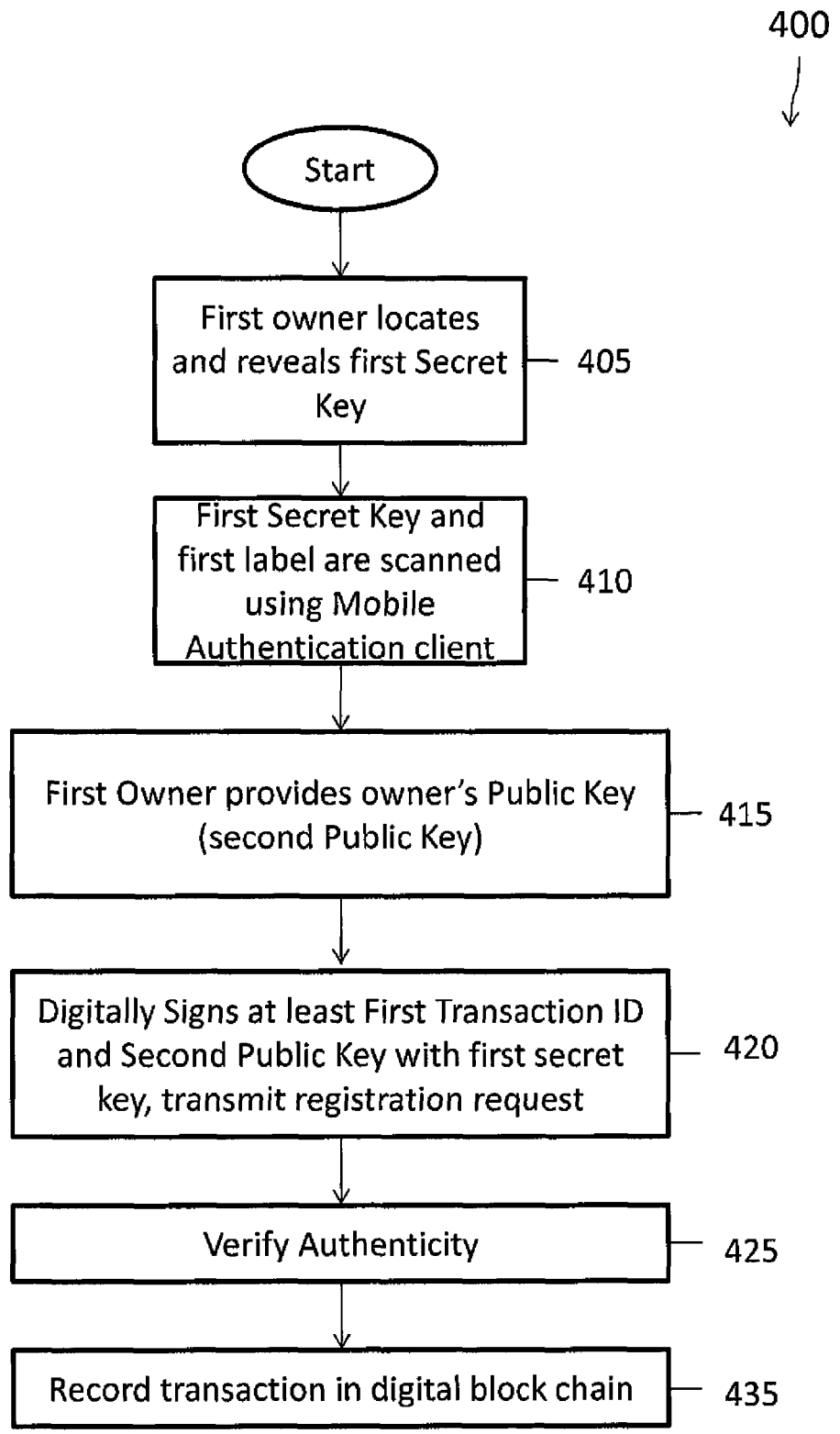
FIG. 4 is a detailed flow diagram illustrating elements of a method for managing authentication of an item according to embodiments of the invention.

Turning now to FIG. 4, which is a detailed flow diagram illustrating exemplary steps for, among other things, verifying authenticity of an item, transferring ownership of the item and recording the transaction according to embodiments of the invention. It should be noted that Method 400, which can be employed, for example, using system 100, can, in some embodiments, be a continuation of the end of Method 200 described in relation to FIGS. 2A and 2B above. In particular, steps 205-240 (FIG. 2A) represent preparatory steps which can be performed prior to a potential purchaser scanning first label 155. Steps 245-280 (FIG. 2B) represent steps which can be preformed as part of an authentication request by a potential purchaser, as explained in detail above. However, as explained above, a purchaser need not and/or might not perform an authentication request prior to purchasing item 150. Therefore, in accordance with embodiments of the invention, Method 400 can also represent a continuation of Method 200 beginning after step 240.

Method 400 starts at step 405 when a first owner of item 150 locates and/or reveals first secret key 160, which, as explained above in relation to FIG. 2A, step 215, is hidden in, on, or provided with item 150. An "owner," as understood herein, refers to one who has acquired item 150.

At step 410, the first owner can then use an MED, such as MED 125, to scan first label 155 and first secret key 160. More specifically, MED processor 165, which is configured by executing one or more software modules 175, including, preferably, the reader module 575 and the request module 580, can read the first label using a reader 168 to retrieve the label data. The label data includes, at least, the manufacturer-digital signature and the first transaction ID. Likewise, the configured MED processor can also read the first secret key 160.

At this juncture, it should be noted that the label data can be transmitted by the configured MED processor 165 to the authentication server 110, and the item 150 can be authenticated, for example, in the manner described in relation to FIG. 2B.

At step 415, the first owner inputs into or otherwise provides the MED 125 with the first owner's own public key, referred to herein as the second public key. More specifically, the MED processor 165, which is configured by executing one or more software modules 175, including, preferably, the user interface module 585, can receive the user's inputs via an input device 178. It should be understood that the second public key has a corresponding second secret key, which remains known only to the first owner, and which the first owner can use in future transactions, if necessary.

In accordance with embodiments of the invention, the second public/secret key pair can be a previously generated pair. Alternatively, if the first owner does not yet have a public/secret key pair and/or would like to create a new one, the second public/secret key pair can be generated by the authentication server 110, using the processor 180, which is configured by executing one or more software modules 505, including, preferably, the key generation module 510, and provided to the MED 125. Likewise, the MED processor 165 can be configured to generate the second public/secret key pair.

Then at step 420, using first secret key 160, the MED processor 165, which is configured by executing one or more software modules 175, including, preferably, the registration module 535, can generate a first digital signature of a set of data including at least the first transaction ID and the second public key. It can be appreciated that the set of data can also include additional information read from the label or concerning the transaction, for example, the manufacturer's digital signature, details of the sale, signatures and/or keys associated with previous transactions, (e.g., first public key) and the like. In addition, the configured MED processor 165 can generate a first owner registration request including, at least, the first digital signature generated using at least the first secret key and the first transaction ID; and the second public key, the second public key being associated with the first owner of the item and having a corresponding second secret key;

At step 425, upon receipt of the first owner registration request, the authentication server 110, using the processor 180, which is configured by executing one or more software modules 190, including, preferably, the authentication module 525 and the notification module 530, can verify the authenticity of the item and notify the first owner accordingly. Preferably, the configured processor 180 can verify that the transaction ID specified in the registration request (i.e., the first transaction ID) has not been recorded in the digital block chain in association with another public key subsequent to being recorded in association with the first public key, for example, in the manner described in relation to step 270 of FIG. 2B.

If authenticity has been verified, then at step 430, the transaction can be recorded in the digital transaction chain and/or stored in database 115, thus effectively assigning the first transaction ID to the first owner. In some implementations, the authentication server processor 180, which is configured by executing one or more software modules 190, including, preferably, the authentication module 525 and registration module 535, can generate a second transaction ID based on the first owner registration request. In addition, the configured processor 180 can record the second transaction ID and the first digital signature (which was signed using the second secret key) and the second public key in a second transaction block of the digital block chain (audit chain).

Because the first digital signature was signed with the first secret key AND using/including the second public key, which is associated with the first owner, recordation of the signature provides the first owner the exclusive ability add entries to the audit trail and transfer control to a new owner.

In some implementations, such as in a self-contained (closed) system, the authentication server 110 can record the transaction in a second transaction block of a digital block chain in memory, for example, in secure database 115. In addition or alternatively, such as when a peer-to-peer live audit trail (e.g., digital transaction chain or digital block chain) is used, the digitally signed message which includes, at least, the second transaction ID, can be recorded in a second transaction block of a digital block chain that is publicly available.

In addition, the second transaction block is eventually hashed using a cryptographic hashing function, to create a second cryptographic hash value for inclusion with a second transaction block of the digital block chain. Preferably, the transaction block is hashed to include the hash value associated with the preceding transaction blocks. As such, the second block includes the cryptographic hash value for the first transaction block, the third transaction block includes the cryptographic hash value of the second block (which already contains the hash value for the first transaction block), and so on. As explained above, in some embodiments hashing of transaction blocks can be performed by miners in a mining network such as mining network 140, to lock the record of the second transaction ID into the digital block chain.

As noted above, hashing also provides "proof of work" and deters the introducing of fake transactions by any one individual, as providing the requisite amount of proof of work would require out-pacing the entire peer-to-peer network, which would involve spending a large amount of time and require prohibitive computing power.

At this juncture, it can be appreciated that one or more steps of method 400 can be repeated to record transfers of ownership for subsequent transactions. By way of example and without limitation, in connection with the sale of the item 150 from the first owner to a second owner, the second owner can provide the first owner with the second owner's public key, referred to as the "third public key" and which is paired with a "third secret key" associated with the second owner, for example, as described at step 415. In addition, the first owner using MED 125 and using the second secret key can generate a second owner digital signature of a set of data including, at least, the second transaction ID and the third public key, for example, as described at step 420. In addition, the signature can include the first transaction ID associated with the prior transaction(s). Accordingly, upon receipt of a second owner registration request including the second owner digital signature from the MED 125, the authentication server 110 can verify the authenticity of the transaction by verifying whether the second transaction ID is associated with any other public keys aside from the second public key associated with the first owner, for example, as described at step 425. In addition, if the transaction is verified, the authentication server 110 can generate a third transaction ID and record the transaction in the digital transaction chain, for example, as described at step 430.

Figure 6:
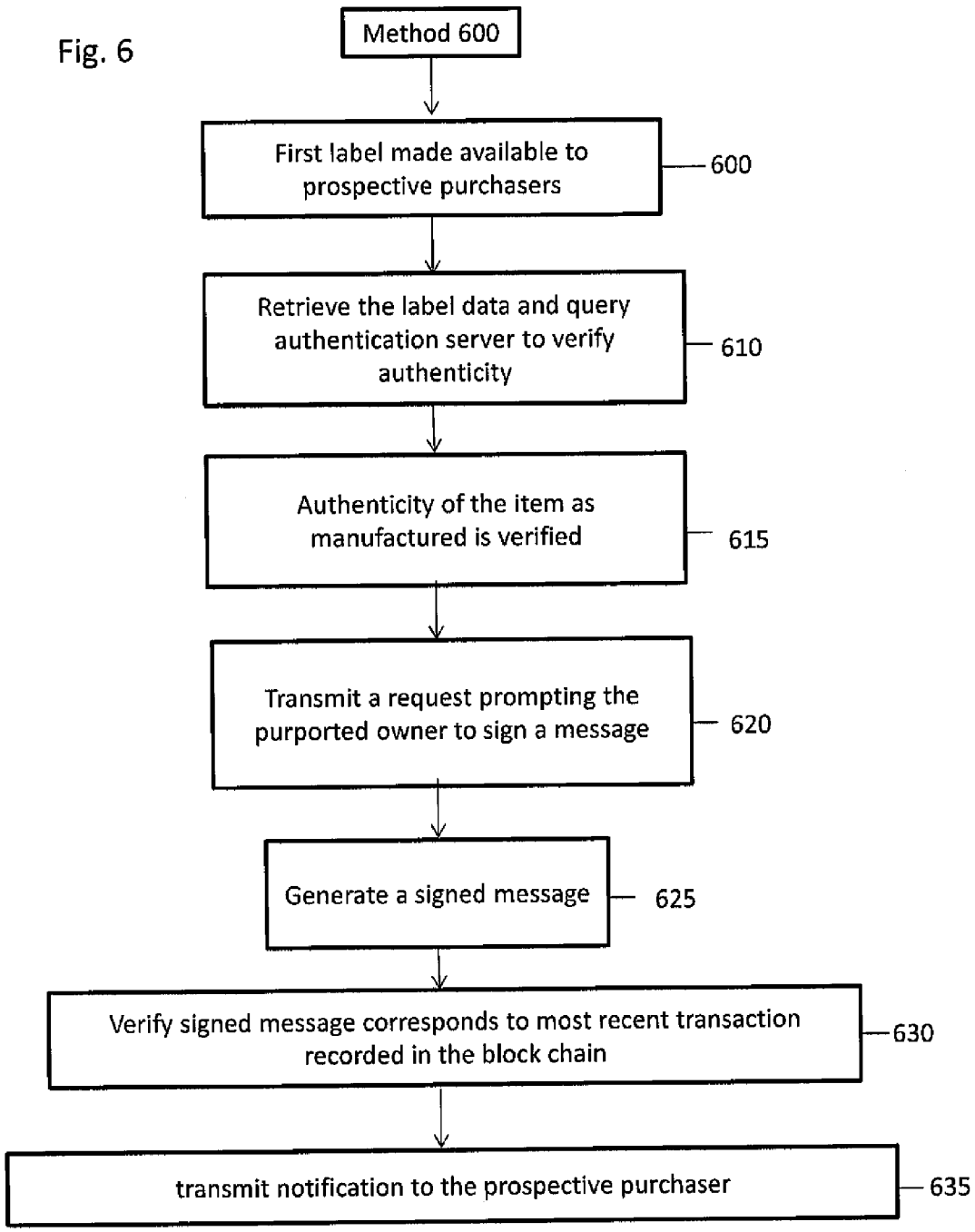
FIG. 6 is a high-level flow diagram illustrating elements of a further method for managing authentication of an item according to embodiments of the invention.

Turning now to FIG. 6, a detailed flow diagram illustrating an exemplary process 600 for verifying the authenticity of an item according to embodiments of the invention is provided. In some implementations, method 600 can be employed, for example, using system 100, to authenticate the item for sale and verify the seller's ability to transfer ownership in connection with the sale (e.g., by the first owner after recordation of the initial transaction) to one or more prospective purchasers of the item.

It should be noted that Method 600, which can be employed, for example, using system 100, can, in some embodiments, be a continuation of the end of Method 400 described in relation to FIG. 4 above. In particular, steps 405-425 represent steps which can be performed as part of a registration request by a first owner, as explained in detail above. However it should be noted that, in accordance with the embodiments described herein, the steps of method 600 can be performed independently of the exemplary steps of FIGS. 2A, 2B and 4.

Method 600 begins at step 605, where the first label 155 or the label data contained therein is made available to one or more prospective purchasers. For example, in a face to face sale of the item 150, the first label 155 can be made physically available to the prospective purchasers. In connection with an impersonal sale, say, using an auction website, a reproduction of the first label 155 or the label data encoded therein can be made publicly available to the potential purchasers.

Accordingly, at step 610, a potential purchaser using, say, MED 130 can retrieve the label data and query authentication server 110 to verify the authenticity of item 150. More specifically, MED processor 165, which is configured by executing one or more software modules 175, including, preferably, the reader module 575 and the request module 580, can read the first label 155 using a reader 168 to retrieve the label data or otherwise receive the label data. Preferably, the retrieved label data includes, at least, the first transaction ID 320. In addition, the configured processor 165 can generate a first authentication request including the retrieved label data, and provide the first authentication request to authentication server 110 over network 105, for example.

Then at step 615, the authenticity of the item as manufactured can be verified, for example, as according to one or more of the steps described in relation to FIG. 2B.

In the context of a sale of the item 150 from the first owner, it is beneficial to also verify the first owner's claim to ownership. Accordingly, at step 620, the prospective purchaser using MED 130 can challenge the authenticity of the first owner's ownership of the item 150. In other words, the prospective purchaser can request analysis of the audit chain associated with the item 150 to determine whether the audit chain supports the first owner's claim of ownership.

In some implementations, the MED processor 165, which is configured by executing one or more software modules, including, preferably, the request module 580, can generate an authentication request including the retrieved label data and requesting authentication of the item's ownership, and provide the authentication request to authentication server 110 over network 105, for example.

At step 620, in response to receipt of the authentication request, authentication server 110, using the processor 180 which is configured by executing one or more software modules 190, including, preferably, the authentication module 525 and the notification module 530, can transmit a request prompting the first owner to sign a message using the first owner's secret key having a corresponding public key that was used to record the previous transaction in the block chain. It can be appreciated that if the transaction conveying ownership to the first user included the second public key, the purported owner can be prompted to sign a message using the first owner's second secret key to prove he controls the second public/secret key pair, and thus the item 150.

At step 625, the first owner using a mobile electronic device, for example, MED 125 having a processor 165, which is configured by executing one or more software modules 175, including, authentication request module 580, can generate a signed message using the second secret key and transmit the message to authentication server 110.

At step 630, in response to receipt of the signed message, authentication server processor 180 which is configured by executing one or more software modules 190, including, preferably the authentication module 525, can verify that the message was signed using a secret key (i.e., the second secret key) that corresponds to the public key (i.e., the second public key) associated with the most recent transaction recorded in the block chain. As previously noted, message authentication involves processing a message with a secret key to produce a digital signature. Thereafter anyone can verify this signature by processing the signature value with the signer's corresponding public key and comparing that result with the message. Success confirms the message is unmodified since it was signed, and—presuming the signer's secret key has remained secret to the signer—that the signer, and no one else, intentionally performed the signature operation.

At step 635, the authentication server processor 180 which is configured by executing one or more software modules 190, including, preferably the authentication module 525, and the notification module 530 can transmit a message to the prospective purchaser notifying the purchaser if the signature of the first owner is verified.

Although the exemplary method 600 has been described in the context of a single prospective purchaser, it can be appreciated that multiple prospective purchasers can similarly request authentication. Moreover, it can be appreciated that the first owner can generate such a signed message in anticipation of authenticity challenges and make it publicly available for other's to verify.

At this juncture, it should be noted that although much of the foregoing description has been directed to systems and methods in support of authentication of an item, the systems and methods disclosed herein can be similarly deployed and/or implemented in scenarios, situations, and settings far beyond the referenced scenarios. It is to be understood that like numerals in the drawings represent like elements through the several figures, and that not all components and/or steps described and illustrated with reference to the figures are required for all embodiments or arrangements.

Thus, illustrative embodiments and arrangements of the present systems and methods provide a computer implemented method, computer system, and computer program product in support of authentication of an item. The flowchart and block diagrams in the figures illustrate the architecture, functionality, and operation of possible implementations of systems, methods and computer program products according to various embodiments and arrangements. In this regard, each block in the flowchart or block diagrams can represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The functions describe herein can be implemented by hardware and or hardware executing code (also known as programs, software, or software applications) which include machine instructions for a programmable processor, and can be implemented in, by example and without limitation, a high-level procedural and/or object-oriented programming language, and/or in assembly/machine language, functional programming, and the like as would be understood by those skilled in the art. As used herein, the terms machine-readable storage medium and computer-readable storage medium refer to any computer program product, apparatus and/or device (e.g., magnetic discs, optical disks, memory, Programmable Logic Devices (PLDs)) used to provide machine instructions and/or data to a programmable processor, including a machine-readable storage medium that receives machine instructions as a machine-readable signal. The term machine-readable signal refers to any signal used to provide machine instructions and/or data to a programmable processor. A machine-readable storage medium does not include a machine-readable signal.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet. A wireless network can include both wired and wireless connections.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method in support of authentication of an item, performed by a server, the server being connected to a network and having a memory, a processor, and one or more code sets stored in the memory and executable in the processor, the method comprising:
   receiving, by the processor, first item information for inclusion in a first label to be associated with the item;
   allocating, by the processor, a first transaction identification (ID) to the manufacturer of the item;
   generating, by the processor, a first secret key having a corresponding first public key;
   receiving, by the processor, a manufacturer-digital signature for inclusion with the first item information and the first transaction ID in the first label;
   generating, by the processor, the first label having a set of label data comprising at least the first item information, the first transaction ID, and the manufacturer-digital signature;
   providing, by the processor, the first label and the first secret key to the manufacturer of the item to be associated with the item;
   receiving, at the processor, a first owner registration request from a first owner device, the first owner registration request comprising at least:
      a first digital signature and a second public key having a corresponding second secret key;
   verifying, by the processor, based on the first owner registration request, that the first transaction ID has not been recorded in a digital block chain in association with another public key subsequent to being recorded in association with the first public key;
   generating, by the processor, based on the first owner registration request, a second transaction ID;
   recording, by the processor, the second transaction ID, the first digital signature, and the second public key in a block of the digital block chain;
   after the recording step, receiving, at the processor, over the network, an ownership authentication request from a potential purchaser device, that comprises at least a portion of the set of label data;
   transmitting, by the processor, a prompt message to the first owner device;
   receiving, by the processor, the prompt message signed by the first owner device using the second secret key;
   verifying, by the processor, that the prompt message has been signed by the first owner device using the second public key; and
   transmitting by the processor, a verification message to the potential purchaser device.

2. The method as in claim 1, wherein the allocating step further comprises:
   digitally signing, by the processor, the first transaction ID and a manufacturer public key;
   recording the digitally signed first transaction ID and the manufacturer public key in a prior block of the digital block chain, wherein the prior block appears earlier in the digital block chain than the first block and
   hashing the first transaction block using a cryptographic hashing function, to create a first cryptographic hash value for inclusion with a subsequent block of the digital block chain.

3. The method as in claim 1, wherein the allocating step further comprises:
   generating the first transaction ID;
   associating the first transaction ID with a unique identifier of the manufacturer; and
   recording the association in a secure database.

4. The method as in claim 1, further comprising:
   prior to receiving the first transaction registration request, receiving, at the processor, a first authentication request, the first authentication request comprising the set of label data scanned from the label, wherein the first authentication request is transmitted over the network to the server;
   confirming, based on the first authentication request, that the set of label data includes at least the first transaction ID;
   querying the digital block chain to retrieve the manufacturer-digital signature;
   verifying that the manufacturer-digital signature was generated by the manufacturer;
   verifying, based on the first authentication request, that the first transaction ID has not been recorded in the digital block chain in association with another public key subsequent to being recorded in association with the first public key; and
   notifying a sender of the first authentication request that the item is verified.

5. The method as in claim 1, further comprising:
   receiving, at the processor, a second owner registration request, the second owner registration request comprising at least:
      a second digital signature generated using at least the second secret key, the first transaction ID, and a third public key, the third public key being associated with a second owner of the item and having a corresponding third secret key;
   verifying, by the processor, based on the second owner registration request, that the second transaction ID has not been recorded in the digital block chain in association with another public key subsequent to being recorded in association with the second public key;
   generating, by the processor, based on the second owner registration request, a third transaction ID; and
   recording the third transaction ID, the second digital signature and the third public key in the digital block chain.

6. The method as in claim 2, wherein recording the second transaction ID, the first digital signature, and the second public key in the second block of the digital block chain further comprises:
confirming that the first block has been previously hashed;
recording the second transaction ID, the first digital signature, and the second public key in the second block of the digital block chain; and
hashing the second block using a cryptographic hashing function, to create a second cryptographic hash value for inclusion with a third block of the digital block chain.

7. The method as in claim 1, wherein the first secret key is affixed to a first portion of the item so as to remain hidden or inaccessible until revealed; and the first public key is affixed to a second portion of the item so as to be visible or accessible without having to be revealed.

8. The method as in claim 1, further comprising:
rejecting the first transaction registration request when the processor cannot verify that the first transaction ID has not been recorded in the digital block chain in association with another public key subsequent to being recorded in association with the first public key; and
generating an error notification for delivery to at least one of a server administrator, the manufacturer, and the first owner of the item.

9. The method as in claim 5, further comprising:
rejecting the second transaction registration when the processor cannot verify that the second transaction ID has not been recorded in the digital block chain in association with another public key subsequent to being recorded in association with the second public key; and
generating an error notification for delivery to at least one of a server administrator, the manufacturer, the first owner of the item, and the second owner of the item.

10. The method as in claim 1, further comprising:
encrypting at least one of the first secret key and the first label prior to providing the at least one of the first secret key and the first label to the manufacturer; wherein the at least one of the first secret key and the first label can be decrypted using a decryption algorithm when scanned.

11. The method as in claim 1, further comprising:
identifying, based on the at least a portion of the set of label data, a most recent block of the digital block chain, wherein the most recent block of the digital block chain includes a most recent public key;
verifying, by the processor, based on the purported owner digital signature and the most recent public key, that the purported owner digital signature corresponds to the most recent public key; and
notifying a sender of the ownership authentication request that the item is verified.

12. The method as in claim 1, wherein the first digital signature is generated using the first secret key to digitally sign a first message comprising at least the first transaction ID and the second public key, and wherein the second public key has a corresponding second secret key.

\* \* \* \* \*